United States Patent
Shibai

(10) Patent No.: US 10,500,902 B2
(45) Date of Patent: Dec. 10, 2019

(54) PNEUMATIC TIRE

(71) Applicant: The Yokohama Rubber Co., LTD., Minato-ku, Tokyo (JP)

(72) Inventor: Takashi Shibai, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 24 days.

(21) Appl. No.: 15/742,016

(22) PCT Filed: May 31, 2016

(86) PCT No.: PCT/JP2016/065977
§ 371 (c)(1),
(2) Date: Jan. 4, 2018

(87) PCT Pub. No.: WO2017/022309
PCT Pub. Date: Feb. 9, 2017

(65) Prior Publication Data
US 2018/0194173 A1  Jul. 12, 2018

(30) Foreign Application Priority Data
Jul. 31, 2015 (JP) .................................. 2015-152604

(51) Int. Cl.
*B60C 11/04* (2006.01)
*B60C 11/117* (2006.01)
(Continued)

(52) U.S. Cl.
CPC .......... *B60C 11/12* (2013.01); *B60C 11/0302* (2013.01); *B60C 11/032* (2013.01);
(Continued)

(58) Field of Classification Search
CPC ......... B60C 11/0304; B60C 2011/0381; B60C 2011/0386; B60C 2011/0388
See application file for complete search history.

(56) References Cited

U.S. PATENT DOCUMENTS

D725,584 S * 3/2015 Ropars ........................ D12/516
2008/0092999 A1* 4/2008 Miyazaki ............ B60C 11/0306
152/209.15
(Continued)

FOREIGN PATENT DOCUMENTS

CN  101456337  6/2009
CN  101678722  3/2010
(Continued)

OTHER PUBLICATIONS

Machine Translation: JP-2006151309-A; Yumii, Keita; (Year: 2019).*
(Continued)

*Primary Examiner* — Kendra Ly
(74) *Attorney, Agent, or Firm* — Thorpe North & Western

(57) ABSTRACT

The pneumatic tire according to the present technology includes a tread portion, sidewall portions, and bead portions, and has a designated mounting direction on a vehicle. The pneumatic tire is provided, in the tread portion, with four main grooves including a pair of center main grooves extending in the tire circumferential direction and a pair of shoulder main grooves located outside the center main grooves and extending in the tire circumferential direction; these main grooves define five rows of land portions; the center main groove on the vehicle outer side has a zigzag shape in the tire circumferential direction; and a plurality of lug grooves extending from the main grooves, except the center main groove having a zigzag shape, toward both sides in the tire lateral direction and terminating in the land portions are provided in the tread portion.

8 Claims, 3 Drawing Sheets

(51) Int. Cl.
  *B60C 11/03* (2006.01)
  *B60C 11/12* (2006.01)
  *B60C 13/02* (2006.01)

(52) U.S. Cl.
  CPC ........ *B60C 11/033* (2013.01); *B60C 11/0304* (2013.01); *B60C 11/0306* (2013.01); *B60C 11/0311* (2013.01); *B60C 13/02* (2013.01); *B60C 2011/0346* (2013.01); *B60C 2011/0348* (2013.01); *B60C 2011/0353* (2013.01); *B60C 2011/0365* (2013.01); *B60C 2011/0381* (2013.01); *B60C 2011/0383* (2013.01); *B60C 2011/0388* (2013.01); *B60C 2011/1209* (2013.01); *B60C 2011/1213* (2013.01)

(56) References Cited

U.S. PATENT DOCUMENTS

| | | | |
|---|---|---|---|
| 2009/0151832 A1 | 6/2009 | Miyoshi et al. | |
| 2010/0116392 A1 | 5/2010 | Yamakawa | |
| 2011/0005653 A1* | 1/2011 | Ebiko | B60C 11/0306 152/209.18 |
| 2011/0067793 A1 | 3/2011 | Nukushina | |
| 2012/0273104 A1 | 11/2012 | Ishida | |
| 2016/0368326 A1 | 12/2016 | Wakizono | |
| 2017/0120688 A1 | 5/2017 | Murata | |

FOREIGN PATENT DOCUMENTS

| | | | |
|---|---|---|---|
| CN | 102036839 | 4/2011 | |
| JP | 2006151309 A * | 6/2006 | |
| JP | 2012-228992 | 11/2012 | |
| JP | 2014-205410 | 10/2014 | |
| JP | 2015-123936 | 7/2015 | |
| JP | 2016-074256 | 5/2016 | |
| WO | WO 2008/152996 | 12/2008 | |
| WO | WO 2010/058627 | 5/2010 | |
| WO | WO-2010099839 A1 * | 9/2010 | ......... B60C 11/0309 |
| WO | WO 2015/098408 | 7/2015 | |
| WO | WO 2015/186443 | 12/2015 | |

OTHER PUBLICATIONS

Machine Translation: WO-2010099839-A1; Maggiora Alberto; (Year: 2019).*

International Search Report for International Application No. PCT/JP2016/065977 dated Aug. 16, 2016, 4pages.

* cited by examiner

PNEUMATIC TIRE

TECHNICAL FIELD

The present technology relates to a pneumatic tire in which four main grooves extending in the tire circumferential direction are provided in a tread portion, and these main grooves define five rows of land portions; and particularly relates to a pneumatic tire that can achieve good steering stability on dry road surfaces and steering stability on wet road surfaces, which are contrary to each other, in a compatible manner with an appropriately set configuration of a tread pattern.

BACKGROUND ART

Pneumatic tires have a tread pattern in which a plurality of rows of land portions are defined by a plurality of main grooves disposed in a tread portion and extend in the tire circumferential direction (for example, see Japanese Unexamined Patent Application Publication No. 2012-228992). Such pneumatic tires are provided with a plurality of lug grooves extending in the tire lateral direction in each of the land portions in the tread portion and thus ensure excellent drainage performance with the lug grooves.

Unfortunately, if the number of the lug grooves in the tread portion is increased, the rigidity of the tread portion decreases and steering stability on dry road surfaces declines. Conversely, if the number of the lug grooves in the tread portion is decreased, drainage performance decreases and steering stability on wet road surfaces declines. In this way, steering stability on dry road surfaces and steering stability on wet road surfaces have a negative correlation with each other, and it is difficult to enhance both simultaneously.

SUMMARY OF TECHNOLOGY

The present technology provides a pneumatic tire that can achieve good steering stability on dry road surfaces and steering stability on wet road surfaces, which are contrary to each other, in a compatible manner with an appropriately set configuration of a tread pattern.

A pneumatic tire according to the present technology includes: a tread portion extending in a tire circumferential direction and formed into an annular shape; a pair of sidewall portions disposed on both sides of the tread portion; and a pair of bead portions disposed inward of the sidewall portions in a tire radial direction; and the pneumatic tire has a designated mounting direction on a vehicle. The pneumatic tire is provided, in the tread portion, with four main grooves including a pair of center main grooves extending in the tire circumferential direction and a pair of shoulder main grooves located outside the center main grooves and extending in the tire circumferential direction; the main grooves defining five rows of land portions; the center main groove on a vehicle outer side having a zigzag shape in the tire circumferential direction; and a plurality of lug grooves being provided in the tread portion, the lug grooves extending from the main grooves, except the center main groove having a zigzag shape, toward both sides in a tire lateral direction and terminating in the land portions.

According to the present technology, the pneumatic tire having a designated mounting direction on a vehicle has a structure in which the center main groove on the vehicle outer side has a zigzag shape and the lug grooves do not communicate with the center main groove, and can thus ensure sufficient rigidity of the land portions located on both sides of the center main groove on the vehicle outer side, resulting in enhancement in steering stability on dry road surfaces. The center main groove having a zigzag shape also contributes to improvement in steering stability on wet road surfaces with edge effect thereof. The plurality of lug grooves extending from the main grooves, except the center main groove having a zigzag shape, toward both sides in the tire lateral direction and terminating in the land portions are provided in the tread portion, so that excellent drainage performance can be ensured while a decrease in rigidity of the tread portion is minimized. Thus, good steering stability on dry road surfaces and steering stability on wet road surfaces can be achieved in a compatible manner to a high degree.

According to the present technology, concerning the lug grooves communicating with the same main groove, an inclination direction, with respect to the tire circumferential direction, of the lug grooves located outside the main groove in the tire lateral direction is preferably the same as an inclination direction, with respect to the tire circumferential direction, of the lug grooves located inside the main groove in the tire lateral direction. The inclination directions of the lug grooves communicating with the same main groove being the same can ensure excellent drainage performance.

An inclination direction, with respect to the tire circumferential direction, of the lug grooves communicating with the center main groove on a vehicle inner side is preferably opposite to an inclination direction, with respect to the tire circumferential direction, of the lug grooves communicating with the shoulder main groove on the vehicle inner side. With the inclination directions of the lug grooves being different from each other in a vehicle inner side region significantly contributing to wet performance, edge effect is increased in the land portion located between the center main groove on the vehicle inner side and the shoulder main groove on the vehicle inner side, resulting in effective enhancement in steering stability on wet road surfaces.

Preferably, the lug grooves extending inward from the shoulder main groove on the vehicle outer side in the tire lateral direction include bent portions at terminating ends of the lug grooves, the bent portions being bent toward a first side in the tire circumferential direction; a plurality of narrow grooves are formed in the land portion in which the lug grooves including the bent portions are formed, the narrow grooves extending discontinuously in the tire circumferential direction without communicating with the bent portions; and the narrow grooves are arranged substantially parallel with the center main groove having a zigzag shape. The lug grooves extending inward from the shoulder main groove on the vehicle outer side in the tire lateral direction are provided with the bent portions, and the plurality of narrow grooves are provided discontinuously in the tire circumferential direction. This configuration can increase effect of enhancing wet performance with edge effect thereof. Furthermore, the narrow grooves arranged substantially parallel with the center main groove having a zigzag shape make rigidity of the land portion uniform and effectively prevent generation of uneven wear.

A width $W1$ of the lug grooves including the bent portions and a width $W2$ of the main groove communicating with the lug grooves preferably satisfy a relationship of $0.10 \times W2 \leq W1 \leq 0.55 \times W2$. This configuration can enhance steering stability on dry road surfaces and steering stability on wet road surfaces in a compatible manner.

Preferably, a circumferential auxiliary groove is provided in a shoulder land portion located outside the shoulder main groove on the vehicle inner side in the tire lateral direction, the circumferential auxiliary groove extending in the tire circumferential direction; a plurality of shoulder lug grooves are provided in the shoulder land portion, the shoulder lug grooves extending inward from an end portion of the tread portion in the tire lateral direction; and the shoulder lug grooves intersect the circumferential auxiliary groove and terminate without reaching the shoulder main groove on the vehicle inner side. The circumferential auxiliary groove and the shoulder lug grooves added to the shoulder land portion on the vehicle inner side can enhance steering stability on wet road surfaces without substantially decreasing steering stability on dry road surfaces.

Stepped portions of the center main groove having a zigzag shape is preferably disposed in positions in extending directions of the lug grooves located in a center land portion located between the pair of center main grooves. This arrangement can enhance uneven wear resistance.

DETAILED DESCRIPTION

Figure 1:
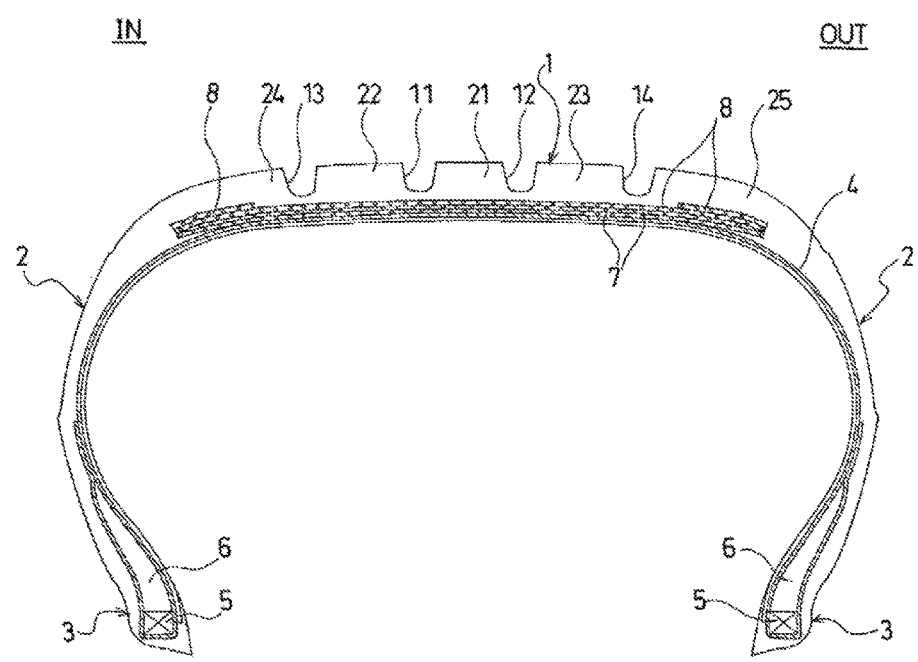
FIG. 1 is a meridian cross-sectional view illustrating a pneumatic tire according to an embodiment of the present technology.
Figure 2:
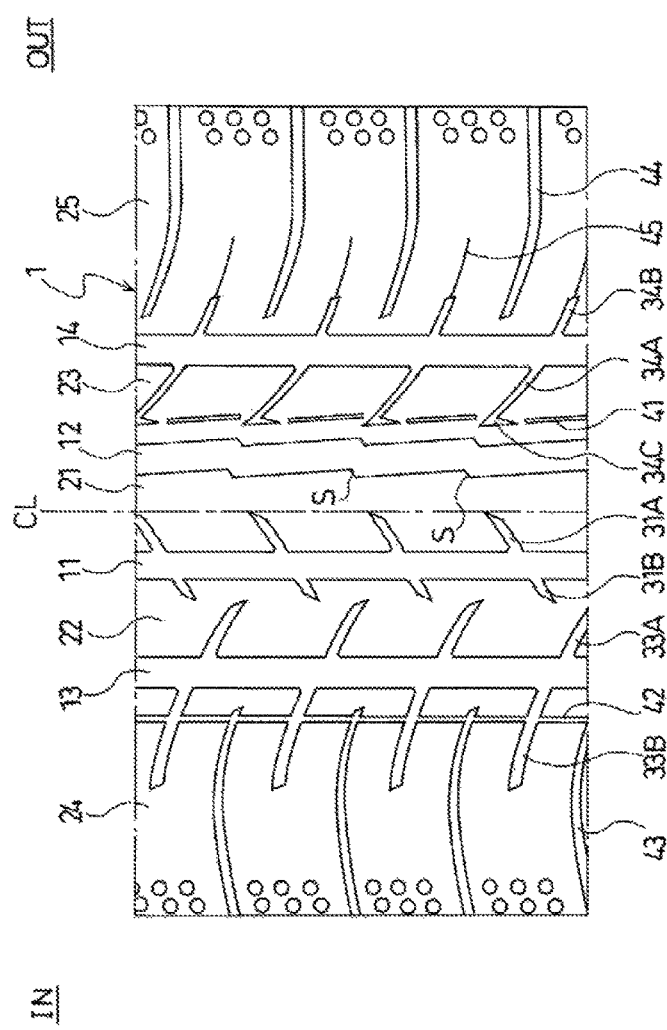
FIG. 2 is a developed view illustrating a tread pattern of the pneumatic tire in FIG. 1.
Figure 3:
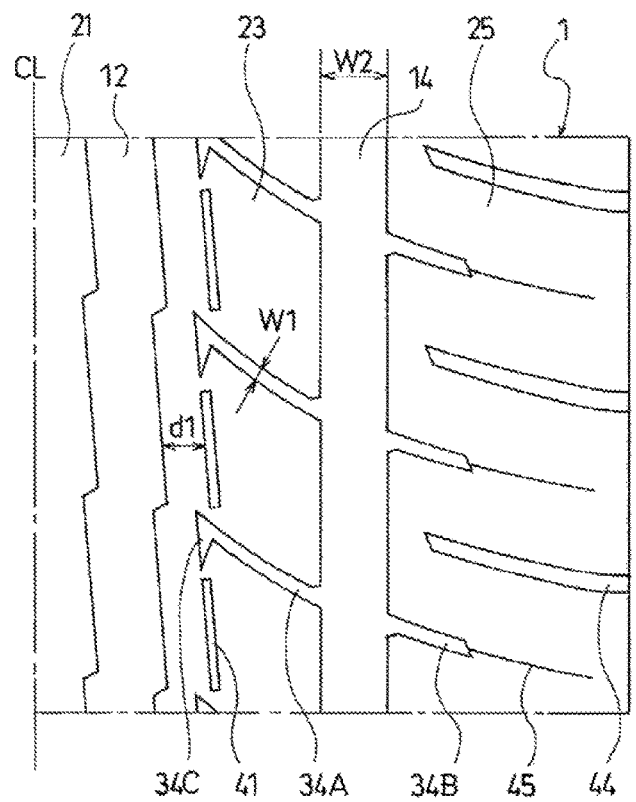
FIG. 3 is a plan view illustrating the main portion of the tread pattern in FIG. 2.

Configurations according to the present technology is described below in detail with reference to the accompanying drawings. FIGS. 1 to 3 illustrate a pneumatic tire according to an embodiment of the present technology. This pneumatic tire has a designated mounting direction concerning the inside and outside of the tire when mounted on a vehicle. In FIGS. 1 to 3, "IN" indicates the vehicle inner side when the tire is mounted on a vehicle, and "OUT" indicates the vehicle outer side when the tire is mounted on a vehicle.

As illustrated in FIG. 1, a pneumatic tire of the present embodiment includes an annular tread portion 1 extending in the tire circumferential direction, a pair of sidewall portions 2, 2 disposed on both sides of the tread portion 1, and a pair of bead portions 3, 3 disposed inward of the sidewall portions 2 in the tire radial direction.

A carcass layer 4 is mounted between the pair of bead portions 3, 3. The carcass layer 4 includes a plurality of reinforcing cords extending in the tire radial direction, and is folded back around a bead core 5 disposed in each of the bead portions 3 from a tire inner side to a tire outer side. A bead filler 6 having a triangular cross-sectional shape formed from rubber composition is disposed on a periphery of the bead core 5.

On the other hand, a plurality of belt layers 7 are embedded on an outer circumferential side of the carcass layer 4 in the tread portion 1. The belt layers 7 include a plurality of reinforcing cords that incline with respect to the tire circumferential direction, and the directions of the reinforcing cords of the different layers intersect each other. In the belt layers 7, an inclination angle of the reinforcing cords with respect to the tire circumferential direction is set in a range from, for example, 10° to 40°. Steel cords are preferably used as the reinforcing cords of the belt layers 7. For the purpose of improving high-speed durability, at least one layer of a belt cover layer 8 formed by arranging reinforcing cords at an angle of, for example, not greater than 5° with respect to the tire circumferential direction, is disposed on an outer circumferential side of the belt layers 7. Nylon, aramid, or similar organic fiber cords are preferably used as the reinforcing cords of the belt cover layer 8.

Note that the tire internal structure described above is exemplary of a pneumatic tire, but is not limited thereto.

As illustrated in FIG. 2, four main grooves 11 to 14 extending in the tire circumferential direction are formed in the tread portion 1. That is, a center main groove 11 located on the vehicle inner side of a tire equator CL, a center main groove 12 located on the vehicle outer side of the tire equator CL, a shoulder main groove 13 located on the vehicle inner side of the center main groove 11, and a shoulder main groove 14 located on the vehicle outer side of the center main groove 12 are formed in the tread portion 1. The center main groove 12 on the vehicle outer side has a zigzag shape in the tire circumferential direction, whereas the other main grooves 11, 13, 14 are linear. These four main grooves 11 to 14 define, in the tread portion 1, a center land portion 21 located on the tire equator CL, an inner intermediate land portion 22 located on the vehicle inner side of the center land portion 21, an outer intermediate land portion 23 located on the vehicle outer side of the center land portion 21, an inner shoulder land portion 24 located on the vehicle inner side of the inner intermediate land portion 22, and an outer shoulder land portion 25 located on the vehicle outer side of the outer intermediate land portion 23.

A plurality of lug grooves 31A, 31B, 33A, 33B, 34A, 34B extending from the main grooves 11, 13, 14, except a zigzag center main groove 12, toward both sides in the tire lateral direction and terminating in the land portions 21 to 25 are formed at intervals in the tire circumferential direction in the tread portion 1.

Specifically, the lug grooves 31A each have a first end communicating with the center main groove 11 and a second end terminating in the center land portion 21, and the lug grooves 31B each have a first end communicating with the center main groove 11 and a second end terminating in the inner intermediate land portion 22. The lug grooves 33A each have a first end communicating with the shoulder main groove 13 and a second end terminating in the inner intermediate land portion 22, and the lug grooves 33B each have a first end communicating with the shoulder main groove 13 and a second end terminating in the inner shoulder land portion 24. The lug grooves 34A each have a first end communicating with the shoulder main groove 14 and a second end terminating in the outer intermediate land portion 23, and the lug grooves 34B each have a first end communicating with the shoulder main groove 14 and a second end terminating in the outer shoulder land portion 25.

Note that the lug grooves 31A and the lug grooves 31B are preferably arranged facing each other but may be arranged, for example, offset in position in the tire circumferential direction to alleviate pattern noise. Such a relationship is also applied to the arrangement of the lug grooves 33A and the lug grooves 33B and the arrangement of the lug grooves 34A and the lug grooves 34B.

The lug grooves 34A extending inward from the shoulder main groove 14 on the vehicle outer side in the tire lateral direction each include a bent portion 34C at the terminating end in the outer intermediate land portion 23. The bent portion 34C is bent into a hook shape toward a first side in the tire circumferential direction. In the outer intermediate land portion 23 in which the lug grooves 34A including the bent portions 34C are formed, a plurality of narrow grooves 41 are formed extending discontinuously in the tire circumferential direction without communicating with the bent portions 34C. The narrow grooves 41 have a groove width of 3.0 mm or less and contain so-called sipes. The narrow grooves 41 are arranged substantially parallel with a zigzag center main groove 12.

It is not necessary that the narrow grooves 41 are exactly parallel with the center main groove 12. The narrow grooves 41 and the center main groove 12 can be regarded as being substantially parallel with each other when $(d1max-d1min)/d1max \leq 0.1$ is satisfied, where d1 is a distance between the narrow grooves 41 and the center main groove 12 in the tire axial direction, d1min is the minimum value of the distance d1, and d1max is the maximum value of the distance d1.

A circumferential auxiliary groove 42 extending in the tire circumferential direction is formed in the inner shoulder land portion 24. The circumferential auxiliary groove 42 has a groove width ranging from 0.8 mm to 3.0 mm. A plurality of shoulder lug grooves 43 extending inward from an end portion of the tread portion 1 in the tire lateral direction are formed at intervals in the tire circumferential direction in the inner shoulder land portion 24. The shoulder lug grooves 43 intersect the circumferential auxiliary groove 42 and terminate without reaching the shoulder main groove 13 on the vehicle inner side.

A plurality of shoulder lug grooves 44 extending inward from an end portion of the tread portion 1 in the tire lateral direction are formed at intervals in the tire circumferential direction in the outer shoulder land portion 25. The shoulder lug grooves 44 terminate without reaching the shoulder main groove 14 on the vehicle outer side. A plurality of sipes 45 extending outward from tip portions of the lug grooves 34B in the tire lateral direction are formed in the outer shoulder land portion 25.

The above-described pneumatic tire has a structure in which the center main groove 12 on the vehicle outer side has a zigzag shape and the lug grooves do not communicate with the center main groove 12, and can thus ensure sufficient rigidity of the land portions 21, 23 located on both sides of the center main groove 12 on the vehicle outer side, resulting in enhancement in steering stability on dry road surfaces. The center main groove 12 having a zigzag shape also contributes to improvement in steering stability on wet road surfaces with edge effect thereof. The plurality of lug grooves 31A, 31B, 33A, 33B, 34A, 34B extending from the main grooves 11, 13, 14, except the center main groove 12 having a zigzag shape, toward both sides in the tire lateral direction and terminating in the land portions 21 to 25 are provided in the tread portion 1, so that excellent drainage performance can be ensured while a decrease in rigidity of the tread portion 1 is minimized. That is, the lug grooves 31A, 31B, 33A, 33B, 34A, 34B do not completely divide the land portions 21 to 25 while exhibiting effective drainage performance by guiding water on road surfaces to the main grooves 11, 13, 14, so that the high rigidity of the tread portion 1 can be maintained. This configuration achieves good steering stability on dry road surfaces and steering stability on wet road surfaces in a compatible manner to a high degree.

In the above-described pneumatic tire, concerning the lug grooves 31A, 31B communicating with the center main groove 11 on the vehicle inner side, the inclination direction, with respect to the tire circumferential direction, of the lug grooves 31B located outside the main groove 11 in the tire lateral direction is the same as the inclination direction, with respect to the tire circumferential direction, of the lug grooves 31A located inside the main groove 11 in the tire lateral direction. Similarly, concerning the lug grooves 33A, 33B communicating with the shoulder main groove 13 on the vehicle inner side, the inclination direction, with respect to the tire circumferential direction, of the lug grooves 33B located outside the main groove 13 in the tire lateral direction is the same as the inclination direction, with respect to the tire circumferential direction, of the lug grooves 33A located inside the main groove 13 in the tire lateral direction. Furthermore, concerning the lug grooves 34A, 34B communicating with the shoulder main groove 14 on the vehicle outer side, the inclination direction, with respect to the tire circumferential direction, of the lug grooves 34B located outside the main groove 14 in the tire lateral direction is the same as the inclination direction, with respect to the tire circumferential direction, of the lug grooves 34A located inside the main groove 14 in the tire lateral direction. The inclination directions of the lug grooves 31A, 31B, 33A, 33B, 34A, 34B communicating with the same main grooves 11, 13, 14 being the same can ensure excellent drainage performance.

In the above-described pneumatic tire, the inclination direction, with respect to the tire circumferential direction, of the lug grooves 31A, 31B communicating with the center main groove 11 on the vehicle inner side is opposite to the inclination direction, with respect to the tire circumferential direction, of the lug grooves 33A, 33B communicating with the shoulder main groove 13 on the vehicle inner side. With the inclination direction of the lug grooves 31A, 31B being different from the inclination direction of the lug grooves 33A, 33B in a vehicle inner side region significantly contributing to wet performance, the inner intermediate land portion 22 located between the center main groove 11 on the vehicle inner side and the shoulder main groove 13 on the vehicle inner side contains edge components in different directions, thus, edge effect thereof increases, resulting in effective enhancement in steering stability on wet road surfaces.

Preferably, in the above-described pneumatic tire, the lug grooves 34A extending inward from the shoulder main groove 14 on the vehicle outer side in the tire lateral direction include, at the terminating ends, the bent portions 34C bent toward the first side in the tire circumferential direction; the plurality of narrow grooves 41 extending discontinuously in the tire circumferential direction without communicating with the bent portions 34C are formed in the outer intermediate land portion 23 in which the lug grooves 34A including the bent portions 34C are formed; and the narrow grooves 41 are arranged substantially parallel with the center main groove 12 having a zigzag shape. In the outer intermediate land portion 23, the lug grooves 34A are provided with the bent portions 34C, and the plurality of narrow grooves 41 are provided discontinuously in the tire circumferential direction. This configuration can further enhance wet performance with edge effect of the bent portions 34C and the narrow grooves 41. The narrow grooves 41 arranged substantially parallel with the center main groove 12 having a zigzag shape make rigidity of the outer intermediate land portion 23 uniform and effectively prevent generation of uneven wear.

As illustrated in FIG. 3, a width W1 of the lug grooves 34A including the bent portions 34C and a width W2 of the shoulder main groove 14 communicating with the lug grooves 34A preferably satisfy a relationship of $0.10 \times W2 \leq W1 \leq 0.55 \times W2$. This configuration can enhance steering stability on dry road surfaces and steering stability on wet road surfaces in a compatible manner. A ratio W1/W2 of less than 0.10 decreases drainage performance and thus decreases effect of enhancing steering stability on wet road surfaces, and conversely, a ratio W1/W2 of greater than 0.55 decreases rigidity of the outer intermediate land portion 23 and decreases effect of enhancing steering stability on dry road surfaces.

The above-described pneumatic tire preferably has a structure in which the circumferential auxiliary groove 42 extending in the tire circumferential direction is provided in the shoulder land portion 24 on the vehicle inner side, the plurality of shoulder lug grooves 43 are provided extending inward from the end portion of the tread portion 1 in the tire lateral direction, and the shoulder lug grooves 43 intersect the circumferential auxiliary groove 42 and terminate without reaching the shoulder main groove 13 on the vehicle inner side. The circumferential auxiliary groove 42 and the shoulder lug grooves 43 added to the shoulder land portion 24 on the vehicle inner side can further enhance steering stability on wet road surfaces without substantially decreasing steering stability on dry road surfaces. That is, effective drainage can be achieved with the lug grooves 33A, the circumferential auxiliary groove 42, and the shoulder lug grooves 43 communicating with each other, and a decrease in rigidity of the shoulder land portion 24 can be prevented with the circumferential auxiliary groove 42 that does not substantially inhibit integrity of the shoulder land portion 24.

As illustrated in FIG. 2, stepped portions S of the center main groove 12 having a zigzag shape are preferably located in positions in extending directions of the lug grooves 31A located in the center land portion 21. This positional relationship between the lug grooves 31A and the stepped portions S of the center main groove 12 can enhance uneven wear resistance.

Examples

Tires of Examples 1 to 8 were manufactured that were pneumatic tires having a size of 215/55R17. The pneumatic tires each included a tread portion, a pair of sidewall portions, and a pair of bead portions, and had a designated mounting direction on a vehicle. As illustrated in FIG. 2, the pneumatic tire was provided, in the tread portion, with four main grooves including a pair of center main grooves extending in the tire circumferential direction and a pair of shoulder main grooves located outside the center main grooves and extending in the tire circumferential direction; these main grooves defined five rows of land portions; the center main groove on the vehicle outer side had a zigzag shape in the tire circumferential direction; and a plurality of lug grooves extending from the main grooves, except the center main groove having a zigzag shape, toward both sides in the tire lateral direction and terminating in the land portions were provided in the tread portion.

A tire of Conventional Example was prepared for comparison. The tire was provided, in the tread portion, with four main grooves including a pair of center main grooves extending in the tire circumferential direction and a pair of shoulder main grooves located outward of the center main grooves and extending in the tire circumferential direction; these main grooves defined five rows of land portions; all the main grooves had a straight shape; and a plurality of lug grooves communicating with the main grooves on both sides thereof were provided between the main grooves.

For Examples 1 to 8, the inclination directions of the lug grooves located on both sides of each of the main grooves, the inclination direction of the lug grooves communicating with the center main groove on the vehicle inner side, the inclination direction of the lug grooves communicating with the shoulder main groove on the vehicle inner side, presence/absence of the bent portions of the lug grooves and the narrow grooves in the outer intermediate land portion, the width W1 of the lug grooves, the width W2 of the main groove, and presence/absence of the circumferential auxiliary groove and the shoulder lug grooves in the inner shoulder land portion were set as shown in Table 1. In Table 1, "Communicating" for "Lug grooves between main grooves" indicates that both ends of the lug grooves communicated with the main grooves, and "Not communicating" for "Lug grooves between main grooves" indicates that one end of each of the lug grooves did not communicate with the main groove.

These test tires were evaluated for steering stability on dry road surfaces, steering stability on wet road surfaces, and uneven wear resistance according to the following test methods. The results thereof are shown in Table 1.

Steering Stability on Dry Road Surfaces:

The test tires were assembled on wheels having a rim size of 17×7.5J and mounted on a front wheel drive vehicle of 2400 cc engine displacement, and the air pressure (F/R) after warm-up was set to 230 kPa/220 kPa. After the vehicle traveled on a dry road surface, panelists conducted sensory evaluation. Evaluation results were expressed as index values with the Conventional Example being defined as 100. Larger index values indicate superior steering stability on dry road surfaces.

Steering Stability on Wet Road Surfaces:

The test tires were assembled on wheels having a rim size of 17×7.5J and mounted on a front wheel drive vehicle of 2400 cc engine displacement, and the air pressure (F/R) after warm-up was set to 230 kPa/220 kPa. The lap time was measured under a rainy condition on a paved test course. The evaluation results were expressed, using the reciprocal of the measured value, with the value of the Conventional Example being defined as 100. Larger index values indicate superior steering stability on wet road surfaces.

Uneven Wear Resistance:

The test tires were assembled on wheels having a rim size of 17×7.5J and mounted on a front wheel drive vehicle of 2400 cc engine displacement, and the air pressure (F/R) after warm-up was set to 230 kPa/220 kPa. After the vehicle traveled 10000 km in the market, the amounts of wear of the center main grooves and the shoulder main grooves were measured, and the difference between the amounts was calculated. The evaluation results were expressed, using the reciprocal of the difference, as index values, with the value of the Conventional Example being defined as 100. Larger index values indicate superior uneven wear resistance.

TABLE 1

|  | Conventional Example | Example 1 | Example 2 | Example 3 | Example 4 |
|---|---|---|---|---|---|
| Zigzag center main groove? | No | Yes | Yes | Yes | Yes |
| Lug grooves between main grooves | Communicating | Not communicating | Not communicating | Not communicating | Not communicating |

TABLE 1-continued

|  | | | | | |
|---|---|---|---|---|---|
| Inclination directions of lug grooves located on both sides of each of main grooves | — | Same | Opposite | Same | Same |
| Inclination direction of lug grooves communicating with center main groove on vehicle inner side | — | Downward to left | — | Downward to right | Downward to left |
| Inclination direction of lug grooves communicating with shoulder main groove on vehicle inner side | — | Downward to right | — | Downward to right | Downward to right |
| Bent portions of lug grooves and narrow grooves? | No | No | Yes | Yes | Yes |
| Width W1 of lug grooves (mm) | 2.0 | 2.0 | 2.0 | 2.0 | 2.0 |
| Width W2 of main groove (mm) | 7.0 | 7.0 | 7.0 | 7.0 | 7.0 |
| Presence/absence of circumferential auxiliary groove and shoulder lug grooves | Absent | Absent | Absent | Absent | Absent |
| Steering stability on dry road surfaces (index value) | 100 | 105 | 105 | 105 | 105 |
| Steering stability on wet road surfaces (index value) | 100 | 106 | 105 | 104 | 108 |
| Uneven wear resistance (index value) | 100 | 100 | 108 | 108 | 108 |

|  | Example 5 | Example 6 | Example 7 | Example 8 |
|---|---|---|---|---|
| Zigzag center main groove? | Yes | Yes | Yes | Yes |
| Lug grooves between main grooves | Not communicating | Not communicating | Not communicating | Not communicating |
| Inclination directions of lug grooves located on both sides of each of main grooves | Same | Same | Same | Same |
| Inclination direction of lug grooves communicating with center main groove on vehicle inner side | Downward to left | Downward to left | Downward to left | Downward to left |
| Inclination direction of lug grooves communicating with shoulder main groove on vehicle inner side | Downward to left | Downward to right | Downward to right | Downward to right |
| Bent portions of lug grooves and narrow grooves? | Yes | Yes | Yes | Yes |
| Width W1 of lug grooves (mm) | 2.0 | 0.7 | 3.9 | 2.0 |
| Width W2 of main groove (mm) | 7.0 | 7.0 | 7.0 | 7.0 |
| Presence/absence of circumferential auxiliary groove and shoulder lug grooves | Absent | Absent | Absent | Present |
| Steering stability on dry road surfaces (index value) | 105 | 107 | 103 | 103 |
| Steering stability on wet road surfaces (index value) | 104 | 105 | 110 | 110 |
| Uneven wear resistance (index value) | 108 | 108 | 108 | 108 |

As can be seen from Table 1, in the tires of Examples 1 to 8, steering stability on dry road surfaces and steering stability on wet road surfaces were enhanced simultaneously, in comparison with the tire of Conventional Example. With, in the outer intermediate land portion, the bent portions being formed at the terminating ends of the lug grooves, the narrow grooves being formed extending discontinuously in the tire circumferential direction without communicating with the bent portions, and the narrow grooves being arranged substantially parallel with the center main groove having a zigzag shape, effect of enhancing uneven wear resistance was significantly exhibited.

The invention claimed is:

1. A pneumatic tire comprising:
   a tread portion extending in a tire circumferential direction and formed into an annular shape;
   a pair of sidewall portions disposed on both sides of the tread portion; and
   a pair of bead portions disposed inward of the sidewall portions in a tire radial direction; and
   the pneumatic tire having a designated mounting direction on a vehicle;
   the pneumatic tire being provided, in the tread portion, with four main grooves comprising a pair of center main grooves extending in the tire circumferential direction and a pair of shoulder main grooves located outside the center main grooves and extending in the tire circumferential direction,
   the main grooves defining five rows of land portions,
   the center main groove on a vehicle outer side having a zigzag shape in the tire circumferential direction,
   a plurality of lug grooves being provided in the tread portion, the lug grooves extending from the main grooves, except the center main groove having the zigzag shape, toward both sides in a tire lateral direction and terminating in the land portions,
   an inclination direction, with respect to the tire circumferential direction, of lug grooves communicating with the center main groove on a vehicle inner side being opposite to an inclination direction, with respect to the tire circumferential direction, of lug grooves communicating with the shoulder main groove on the vehicle inner side,
   lug grooves extending inward from the shoulder main groove on the vehicle outer side in the tire lateral direction comprising bent portions at terminating ends of the lug grooves, the bent portions being bent toward a first side in the tire circumferential direction,
   a plurality of narrow grooves being formed in the land portion in which the lug grooves comprising the bent portions are formed, the narrow grooves extending discontinuously in the tire circumferential direction without communicating with the bent portions, and
   the narrow grooves being arranged substantially parallel with the center main groove having a zigzag shape.

2. The pneumatic tire according to claim 1, wherein a subset of the plurality of lug grooves communicate with a same main groove, and an inclination direction, with respect to the tire circumferential direction, of lug grooves of the subset located outside the same main groove in the tire lateral direction is the same as an inclination direction, with respect to the tire circumferential direction, of lug grooves of the subset located inside the same main groove in the tire lateral direction.

3. The pneumatic tire according to claim 2, wherein a width $W1$ of the lug grooves comprising the bent portions and a width $W2$ of a main groove communicating with the lug grooves satisfy a relationship of $0.10 \times W2 \leq W1 \leq 0.55 \times W2$.

4. The pneumatic tire according to claim 3, wherein:
   a circumferential auxiliary groove is provided in a shoulder land portion located outside the shoulder main groove on the vehicle inner side in the tire lateral direction, the circumferential auxiliary groove extending in the tire circumferential direction;
   a plurality of shoulder lug grooves are provided in the shoulder land portion, the shoulder lug grooves extending inward from an end portion of the tread portion in the tire lateral direction; and
   the shoulder lug grooves intersect the circumferential auxiliary groove and terminate without reaching the shoulder main groove on the vehicle inner side.

5. The pneumatic tire according to claim 4, wherein stepped portions of the center main groove having a zigzag shape is located in positions in extending directions of the lug grooves located in a center land portion located between the pair of center main grooves.

6. The pneumatic tire according to claim 1, wherein a width $W1$ of the lug grooves comprising the bent portions and a width $W2$ of a main groove communicating with the lug grooves satisfy a relationship of $0.10 \times W2 \leq W1 \leq 0.55 \times W2$.

7. The pneumatic tire according to claim 1, wherein:
   a circumferential auxiliary groove is provided in a shoulder land portion located outside the shoulder main groove on the vehicle inner side in the tire lateral direction, the circumferential auxiliary groove extending in the tire circumferential direction;
   a plurality of shoulder lug grooves are provided in the shoulder land portion, the shoulder lug grooves extending inward from an end portion of the tread portion in the tire lateral direction; and
   the shoulder lug grooves intersect the circumferential auxiliary groove and terminate without reaching the shoulder main groove on the vehicle inner side.

8. The pneumatic tire according to claim 1, wherein stepped portions of the center main groove having a zigzag shape is located in positions in extending directions of the lug grooves located in a center land portion located between the pair of center main grooves.

* * * * *